March 29, 1938. P. E. DOUBLE 2,112,594
CLINCH NUT AND METHOD OF MAKING
Filed Jan. 22, 1937
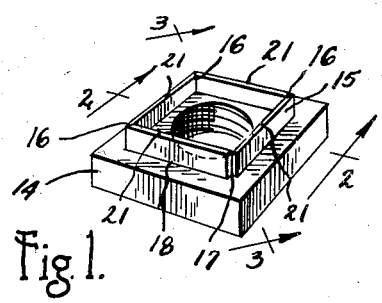
Fig. 1.
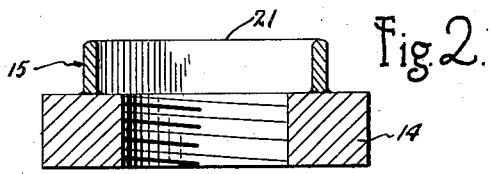
Fig. 2.
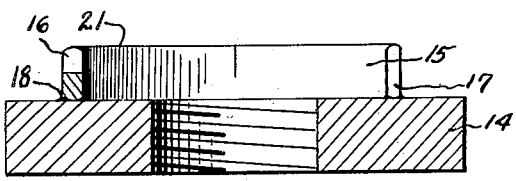
Fig. 3.
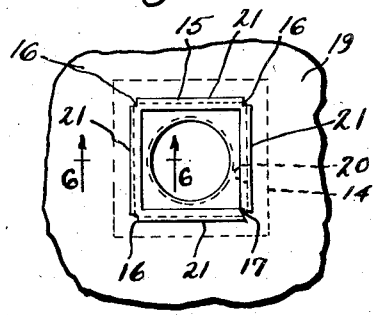
Fig. 5.
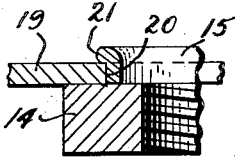
Fig. 6.
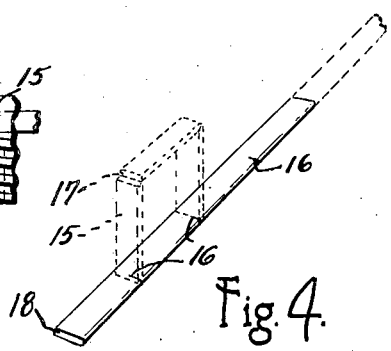
Fig. 4.
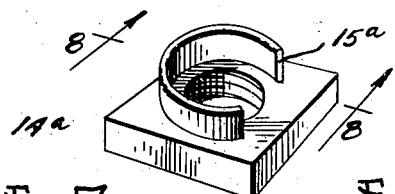
Fig. 7.
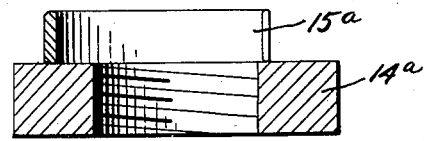
Fig. 8.
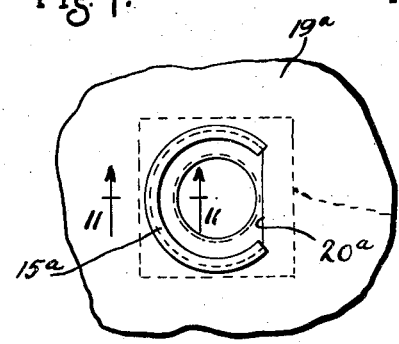
Fig. 10.
Fig. 11.
Fig. 9.
INVENTOR.
Plummer E. Double
BY Edward M. Apple
ATTORNEY.

Patented Mar. 29, 1938

2,112,594

UNITED STATES PATENT OFFICE 2,112,594

CLINCH-NUT AND METHOD OF MAKING

Plummer E. Double, Detroit, Mich.

Application January 22, 1937, Serial No. 121,760

3 Claims. (Cl. 10—86)

This invention relates to clinch nuts and has particular reference to an improved clinch nut and method of forming the same. The invention herein disclosed is akin in principle to the inventions disclosed in my co-pending applications, S. N. 81,887, filed May 26, 1936, and S. N. 97,963, filed August 26, 1936.

In assembling automobiles, stoves, and other articles of manufacture it is necessary to provide threaded apertures in certain pieces, so that other pieces or elements may be attached thereto with ease and security. Particularly in assembling bodies in the automobile industry where comparatively light gauge metal is used it is necessary to provide threaded elements which have more thread area than the thickness of the body metal itself provides. These elements are often required in more or less inaccessible places and they must be accurately positioned to facilitate the rapid assembly of a car as it proceeds along an assembly line. To assist in overcoming the inherent difficulties, it became the common practice to punch holes in the metal at required places and insert therein some form of a nut which could be secured to the metal by riveting or other means. Various types of nuts for this purpose have been proposed, one of which is shown in the applications, hereinabove identified. With the exception of the nut disclosed in my co-pending applications all of the clinch nuts used heretofore have been comparatively expensive to manufacture. It is the purpose of this disclosure to teach how to make a clinch nut with a minimum of expense.

Another object of this invention is to provide a clinch nut which may be assembled by using a standard square, or other standard shaped nut as the foundation, and attaching thereto a collar of any predetermined shape required to engage the aperture formed in the sheet metal to which the nut is to be attached.

Another object of the invention is the provision of a clinch nut which may be formed without the necessity of expensive machining operations in its fabrication.

The foregoing objects and other advantages of the invention will become apparent as the description proceeds, reference being had to the accompanying drawing wherein:

Fig. 1 is a perspective view of a nut embodying my invention.

Fig. 2 is a section taken on line 2—2 of Fig. 1.

Fig. 3 is a section taken on line 3—3 of Fig. 1.

Fig. 4 is a detailed view of the element from which I prefer to form the collar of the nut.

Fig. 5 is a plan view showing a nut, similar to the one in Fig. 1, attached to a fragment of metal.

Fig. 6 is a section taken on line 6—6 of Fig. 5.

Fig. 7 is a clinch nut embodying my invention but having a different shaped collar from the nut shown in Fig. 1.

Fig. 8 is a section taken on line 8—8 of Fig. 7.

Fig. 9 is a detail showing the element used to form the collar of the nut illustrated in Fig. 7.

Fig. 10 is a plan view showing a nut, similar to the one illustrated in Fig. 7, attached to a fragment of metal.

Fig. 11 is a section taken on line 11—11 of Fig. 10.

Referring now more particularly to the drawing it will be seen that in the embodiments herein disclosed the clinch nuts consist of the internally threaded bodies 14 and 14a and the collars 15 and 15a, which are secured thereto as hereinafter described. The bodies 14 and 14a are standard shaped square nuts which are formed in the customary manner. It is obvious that any shaped standard nut may be employed with equal advantage in practicing this invention. In Fig. 1 I have shown a clinch nut fabricated with a square collar 15 and in Fig. 7 a similar nut is shown, fabricated with a C shaped collar 15a. In fabricating a nut such as is illustrated in Fig. 1 I prefer to provide a suitable diameter round wire which I run through a machine in order to flatten it on two sides as illustrated in Fig. 4. The flattened wire is then cut into suitable lengths and rolled into a hollow square as shown by the dotted lines in Fig. 4. To enable the nut to be more easily riveted to another element I prefer to make breaks or incisions as at 16 in the collar 15. These breaks 16 extend inwardly a suitable distance from one edge of the collar and are spaced to coincide with three of the corners of the square. These incisions 16 permit the edges 21 to be layed over without using excessive force at the corners. The fourth corner 17 of the collar 15 remains an open joint. Although this is the preferred method of making the hollow square collar 15 it will be understood that it may also be made from square tubing cut into suitable widths. After the collar 15 is formed, it is then secured along the uncut edge 18 to the upper surface of the nut body 14, preferably by projection welding, sweating, soldering or similar means. In attaching the collar 15 by projection welding, that operation is assisted by reason of the curved formation of the contacting edge 18, resulting from the collar 15 being made from a round wire as described. This curved edge 18 when heated in the welding process fuses easily and allows the collar 15 to settle into a firm position on the nut body 14, thereby effecting a very satisfactory bond. After the collar 15 is secured in place the nut may then be riveted to a piece of metal 19 (Fig. 5) by inserting the collar 15 through an aperture 20, formed in the metal 19 and laying the edges 21 over the metal 19 by any suitable means. The C shaped collar 15a (Fig. 7) is formed of a similar piece of wire stock but it is not necessary to provide the incisions 16 (Fig. 4) in order to work it and attach it to the metal 19a (Fig. 10). The C shaped collar 15a is secured to the nut body 14a and ultimately riveted to the metal 19a in all respects similarly to the operations described with reference to the nut 14 and collar 15. In the modified form (Figs. 7 to 10) parts corresponding to the various parts illustrated in Figs. 1 to 6 are designated with like reference characters plus the letter "a".

Having described my invention, what I claim and desire to secure by Letters Patent is:

1. A clinch nut comprising an internally threaded standard shaped nut, having secured to one side thereof, by welding, a collar defining a portion of a circle.

2. The method of making a clinch nut from a standard nut, which consists of forming a collar of predetermined shape, by rolling a strip of metal, and then securing said preformed collar to said standard nut by welding.

3. The method of making a clinch-nut from a standard nut, which consists of providing a narrow strip of metal, making incisions at spaced intervals along one edge of said strip, forming a collar of predetermined shape of said strip, and then securing said collar to said nut by welding.

PLUMMER E. DOUBLE.